US009822651B2

(12) United States Patent
LeBlanc

(10) Patent No.: US 9,822,651 B2
(45) Date of Patent: Nov. 21, 2017

(54) SYNCHRONIZATION RING RUNNER WITH CRADLE

(71) Applicant: UNITED TECHNOLOGIES CORPORATION, Hartford, CT (US)

(72) Inventor: Ryan Edward LeBlanc, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 267 days.

(21) Appl. No.: 14/427,706

(22) PCT Filed: Sep. 27, 2013

(86) PCT No.: PCT/US2013/062325
§ 371 (c)(1),
(2) Date: Mar. 12, 2015

(87) PCT Pub. No.: WO2014/052842
PCT Pub. Date: Apr. 3, 2014

(65) Prior Publication Data
US 2015/0252680 A1 Sep. 10, 2015

Related U.S. Application Data

(60) Provisional application No. 61/788,138, filed on Mar. 15, 2013, provisional application No. 61/707,831, filed on Sep. 28, 2012.

(51) Int. Cl.
F01D 17/16 (2006.01)
F01D 9/04 (2006.01)
(Continued)

(52) U.S. Cl.
CPC ............ F01D 9/04 (2013.01); F01D 1/02 (2013.01); F01D 7/00 (2013.01); F01D 17/162 (2013.01);
(Continued)

(58) Field of Classification Search
CPC ...... F01D 17/16; F01D 17/162; F01D 25/162; F01D 25/166; F05D 2260/30;
(Continued)

(56) References Cited

U.S. PATENT DOCUMENTS 2,933,234 A * 4/1960 Neumann ............ F01D 17/162
415/149.4
3,990,809 A * 11/1976 Young .................. F01D 17/162
415/160
(Continued)

OTHER PUBLICATIONS

Extended European Search Report for EP Application 13841937.9, dated Aug. 7, 2016, 10 pages.
(Continued)

Primary Examiner — Ninh H Nguyen
(74) Attorney, Agent, or Firm — Kinney & Lange, P.A.

(57) ABSTRACT

A runner assembly includes a runner with an aperture, a cradle, and a fastener. The cradle includes a planar base with an aperture, a tab extending from the base, and fingers extending from the base. The fastener extends through the apertures for attaching the runner to the cradle, and the fingers are adjacent to the runner and constrain the runner with respect to the cradle and the fastener.

20 Claims, 8 Drawing Sheets

(51) Int. Cl.
 *F01D 25/24* (2006.01)
 *F02C 9/20* (2006.01)
 *F01D 1/02* (2006.01)
 *F01D 7/00* (2006.01)

(52) U.S. Cl.
 CPC .............. *F01D 25/243* (2013.01); *F02C 9/20* (2013.01); *F05D 2260/30* (2013.01); *Y02T 50/672* (2013.01)

(58) Field of Classification Search
 CPC ............. F05D 2260/31; F05D 2250/90; F05D 2240/50; F02C 9/22
 See application file for complete search history.

(56) References Cited

U.S. PATENT DOCUMENTS

| | | | |
|---|---|---|---|
| 4,812,106 A | 3/1989 | Purgavie | |
| 4,925,364 A | 5/1990 | Das | |
| 5,211,537 A | 5/1993 | Langston et al. | |
| 5,387,080 A | 2/1995 | Bouhennicha et al. | |
| 6,884,025 B2 | 4/2005 | Pickens et al. | |
| 7,198,454 B2 * | 4/2007 | Evans | F01D 17/162 415/12 |
| 7,244,098 B2 | 7/2007 | Bromann | |
| 7,396,203 B2 | 7/2008 | Martindale | |
| 7,677,866 B2 | 3/2010 | Bromann | |
| 8,092,157 B2 | 1/2012 | Mccaffrey | |
| 8,123,472 B2 | 2/2012 | Redgwell | |
| 2004/0062641 A1 | 4/2004 | Pickens et al. | |
| 2007/0183889 A1 | 8/2007 | Bromann | |
| 2009/0208307 A1 | 8/2009 | Guyton | |
| 2012/0195751 A1 | 8/2012 | Gasmen et al. | |
| 2012/0195755 A1 | 8/2012 | Gasmen et al. | |

OTHER PUBLICATIONS

International Preliminary Report on Patentability for PCT/US2013/062325, dated Mar. 31, 2015.
International Search Report for PCT/US2013/062325, dated Jan. 8, 2014.

* cited by examiner

SYNCHRONIZATION RING RUNNER WITH CRADLE

BACKGROUND

The present invention is related to gas turbine engines, and in particular to variable stator vanes and variable stator vane actuation mechanisms.

Gas turbine engines operate by combusting fuel in compressed air to create heated gases with increased pressure and density. The heated gases are used to rotate turbines within the engine that are used to produce thrust or generate electricity. For example, in a propulsion engine, the heated gases are ultimately forced through an exhaust nozzle at a velocity higher than which inlet air is received into the engine to produce thrust for driving an aircraft. The heated gases are also used to rotate turbines within the engine that are used to drive a compressor that generates compressed air necessary to sustain the combustion process.

The compressor and turbine sections of a gas turbine engine typically comprise a series of rotor blade and stator vane stages, with the rotating blades pushing air past the stationary vanes. In general, stators redirect the trajectory of the air coming off the rotors for flow into the next stage. In the compressor, stators convert kinetic energy of moving air into pressure, while, in the turbine, stators accelerate pressurized air to extract kinetic energy. Gas turbine efficiency is, therefore, closely linked to the ability of a gas turbine engine to efficiently direct airflow within the compressor and turbine sections of the engine. Airflow through the compressor and turbine sections differs at various operating conditions of the engine, with more airflow being required at higher output levels. Variable stator vanes have been used to advantageously control the incidence of airflow onto rotor blades of subsequent compressor and turbine stages under different operating conditions.

Variable stator vanes are typically radially arranged within at least one shroud, which permits the vanes to rotate about trunnion posts at their innermost and outermost ends to vary the pitch of the vane. Typically, the outermost trunnion posts include crank arms that are connected to a synchronization ring, which is rotated by an actuator to rotate the vanes in unison. The outermost trunnions extend through the shroud, which could be an engine case, such that the synchronization ring is positioned outside of the shroud, while the vane airfoils are within the shroud, in the stream of the gases flowing through the engine. The engine case comprises a rigid structural component necessary for containing the high operational pressures of the engine, while the synchronization ring only requires enough stiffness to transmit torque to the crank arms. As such, the synchronization ring has a tendency to deform, due to chording and localized force reactions, when acted upon by the actuator as the synchronization ring is suspended over the engine case by the crank arms. These deformations cause an undesirable error in the positions of the vanes controlled by that ring. Typically, runners are positioned between the synchronization ring and the engine case to locally and radially support the synchronization ring. The runners link the synchronization ring to the engine case such that the engine case lends its stiffness to the synchronization ring, thus retaining the centricity of the synchronization ring. By reducing the deflections of the ring and maintaining centricity, the error in the vane positions is greatly reduced, thereby improving engine performance and operability.

Because the synchronization ring is disposed outside of the engine case and the flow of the gases, the synchronization ring is less affected by the temperature of the gasses. This results in the engine case expanding and contracting in response to a change in the gas temperature more quickly than the synchronization ring does. This uneven expansion and contraction between the synchronization ring and the engine case can put stress on the runners that can eventually lead to their failure.

SUMMARY

According to one embodiment, a runner assembly includes a runner with an aperture, a cradle, and a fastener. The cradle includes a planar base with an aperture, a tab extending from the base, and fingers extending from the base. The fastener extends through the apertures for attaching the runner to the cradle, and the fingers are adjacent to the runner and constrain the runner with respect to the cradle and the fastener.

In another embodiment, a runner assembly includes a cradle, a runner, and a fastener. The cradle has a base, a fastener aperture, tabs, and fingers, and the base and tabs are planar. The runner is positioned between the base and the fingers of the cradle and has a mounting portion, a contact portion, and a fastener aperture through both. The mounting portion includes a planar cradle side, and the contact portion includes a curved contact side. The fastener extends through the fastener apertures in the cradle and the runner, attaching the runner to the cradle.

DETAILED DESCRIPTION

Figure 1:
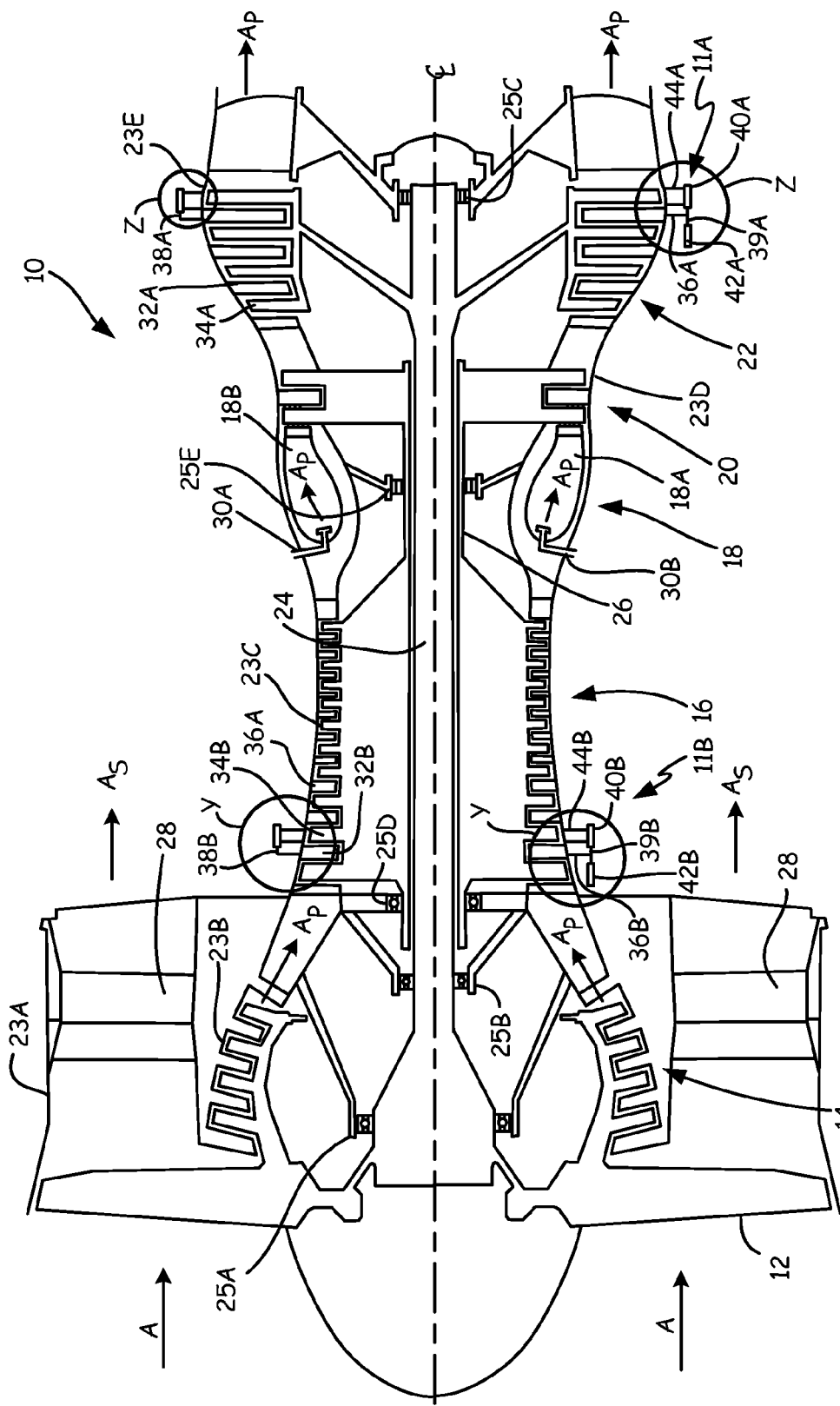
FIG. 1 shows a schematic cross sectional view of a gas turbine engine including two variable vane actuation mechanisms.

FIG. 1 shows a schematic cross section of gas turbine engine 10 in which variable vane actuation mechanisms 11A and 11B according to embodiments of the present invention are used. In the embodiment shown, gas turbine engine 10 comprises a dual-spool, high bypass ratio turbofan engine having a variable vane turbine section incorporating actuation mechanisms 11A and 11B. In other embodiments, gas turbine engine 10 comprises other types of gas turbine engines used for aircraft propulsion or power generation, or other similar systems incorporating variable stator vanes, including a three-spool gas turbine engine configuration. Although the advantages of actuation mechanisms 11A and 11B are particularly well suited for turbine sections and/or compressor sections having variable vanes, the invention is readily applicable to other applications where adjacent components move relatively to one another.

Gas turbine engine 10, of which the operational principles are well known in the art, comprises fan 12, low pressure compressor (LPC) 14, high pressure compressor (HPC) 16 (including actuation mechanism 11B), combustor section 18, high pressure turbine (HPT) 20 and low pressure turbine (LPT) 22 (including actuation mechanism 11A), which are each concentrically disposed around axial engine centerline CL. Fan 12, LPC 14, HPC 16, HPT 20, LPT 22 and other engine components are enclosed at their outer diameters within various engine casings, including fan case 23A, LPC case 23B, HPC case 23C, HPT case 23D and LPT case 23E. Fan 12 and LPC 14 are connected to LPT 22 through shaft 24, which is supported by ball bearing 25A and roller bearing 25B toward its forward end, and ball bearing 25C toward its aft end. Together, fan 12, LPC 14, LPT 22 and shaft 24 comprise the low pressure spool. HPC 16 is connected to HPT 20 through shaft 26, which is supported within engine 10 at ball bearing 25D and roller bearing 25E. Together, HPC 16, HPT 20 and shaft 26 comprise the high pressure spool.

Inlet air A enters engine 10 whereby it is divided into streams of primary air $A_P$ and secondary air $A_S$ after passing through fan 12. Fan 12 is rotated by low pressure turbine 22 through shaft 24 (either directly as shown or through a gearbox, not shown) to accelerate secondary air $A_S$ (also known as bypass air) through exit guide vanes 28, thereby producing a significant portion of the thrust output of engine 10. Primary air $A_P$ (also known as gas path air) is directed first into low pressure compressor 14 and then into high pressure compressor 16. LPC 14 and HPC 16 work together to incrementally increase the pressure and temperature of primary air $A_P$. HPC 16 is rotated by HPT 20 through shaft 26 to provide compressed air to combustor section 18. The compressed air is delivered to combustors 18A-18B, along with fuel from injectors 30A and 30B, such that a combustion process can be carried out to produce high energy gases necessary to turn high pressure turbine 20 and low pressure turbine 22. Primary air $A_P$ continues through gas turbine engine 10 whereby it is typically passed through an exhaust nozzle to further produce thrust.

Flow of primary air $A_P$ through engine 10 is enhanced or otherwise modulated through the use of variable stator vanes at various locations within the compressor and turbine sections. In particular, LPT 22 includes variable stator vanes 32A, which are disposed axially between blades 34A. The pitch of variable stator vanes 32A is adjusted by actuation mechanism 11A. Similarly, high pressure compressor 16 includes variable stator vanes 32B, which are disposed axially between blades 34B. As will be discussed later with respect to FIGS. 6-7, the pitch of variable stator vanes 32B is adjusted by variable vane actuation system 11B.

Each variable stator vane 32A includes outer trunnion 36A, which extends through LPT case 23E and connects with one of a plurality of crank arms 38A. Actuation mechanism 11A (shown at callout Z) includes synchronization ring 40A, actuator 42A, and runner ring 44A. In the illustrated embodiment, each crank arm 38A is connected to synchronization ring 40A, with one of the crank arms being master arm 39A that is also being connected to actuator 42A.

When pushed, pulled, or otherwise urged by actuator 42A, master arm 39A causes circumferential rotation of synchronization ring 40A about centerline CL. Synchronization ring 40A correspondingly pushes or pulls on the remaining crank arms 38A to cause trunnions 36A and vanes 32A to rotate about their radial axes, which extend perpendicular to centerline CL. When actuated, vanes 32A rotate in unison to adjust the flow of primary air $A_P$ through engine 10 for different operating conditions. For example, when engine 10 undergoes transient loading such as a during take-off operation, the mass flow of primary air $A_P$ pushed through LPT 22 increases as engine 10 goes from idle to high-throttle operation. As such, the pitch of vanes 32A may be continually altered to, among other things, improve airflow and prevent stall.

Similarly, variable stator vanes 32B include outer trunnions 36B, which extend through HPC case 23C and connect with crank arms 38B. Actuation mechanism 11B (shown at callout Y) includes synchronization ring 40B, actuator 42B, and runner ring 44B. In the illustrated embodiment, each crank arm 38B is connected to synchronization ring 40B, with one of the crank arms being master arm 39B that is also being connected to actuator 42A. When pushed, pulled, or otherwise urged by actuator 42A, master arm 39B causes circumferential rotation of synchronization ring 40B about centerline CL. Synchronization ring 40B correspondingly pushes or pulls on the remaining crank arms 38B to cause trunnions 36B and vanes 32B to rotate about their radial axes, which extend perpendicular to centerline CL. When actuated, vanes 32B rotate in unison to adjust the flow of primary air $A_P$ through engine 10 for different operating conditions.

LPT case 23E, being a vital structural component of engine 10, comprises a sturdy, rigid structure capable of receiving substantial axial and radial loading imparted during operation of engine 10. Synchronization ring 40A, however, comprises a hollow annular square tube that primarily functions to transmit torque loads from the master crank arms to crank arms 38A and is therefore as light as possible to reduce engine weight. As with LPT case 23E, synchronization ring 40A is typically split into two-pieces to provide access to vanes 32A and blades 34A. As such, maintaining the circularity or centricity of synchronization ring 40A when torque is applied from actuator 42A during transient loading conditions of engine 10 is inhibited by the function and construction of synchronization ring 40A. LPT 22 includes actuation mechanism 11A of the present invention to prevent distortion and deformation of synchronization ring 40A during operation of engine 10, particularly during transient loading operation. Thermal gradients produced within engine 10 during transient loading induce varying thermal expansions of synchronization ring 40A and LPT case 23E. Runner ring 44A expands radially with synchronization ring 40A, without binding against LPT case 23E, to provide a rigid frame that synchronization ring 40A engages for support.

Figure 2:
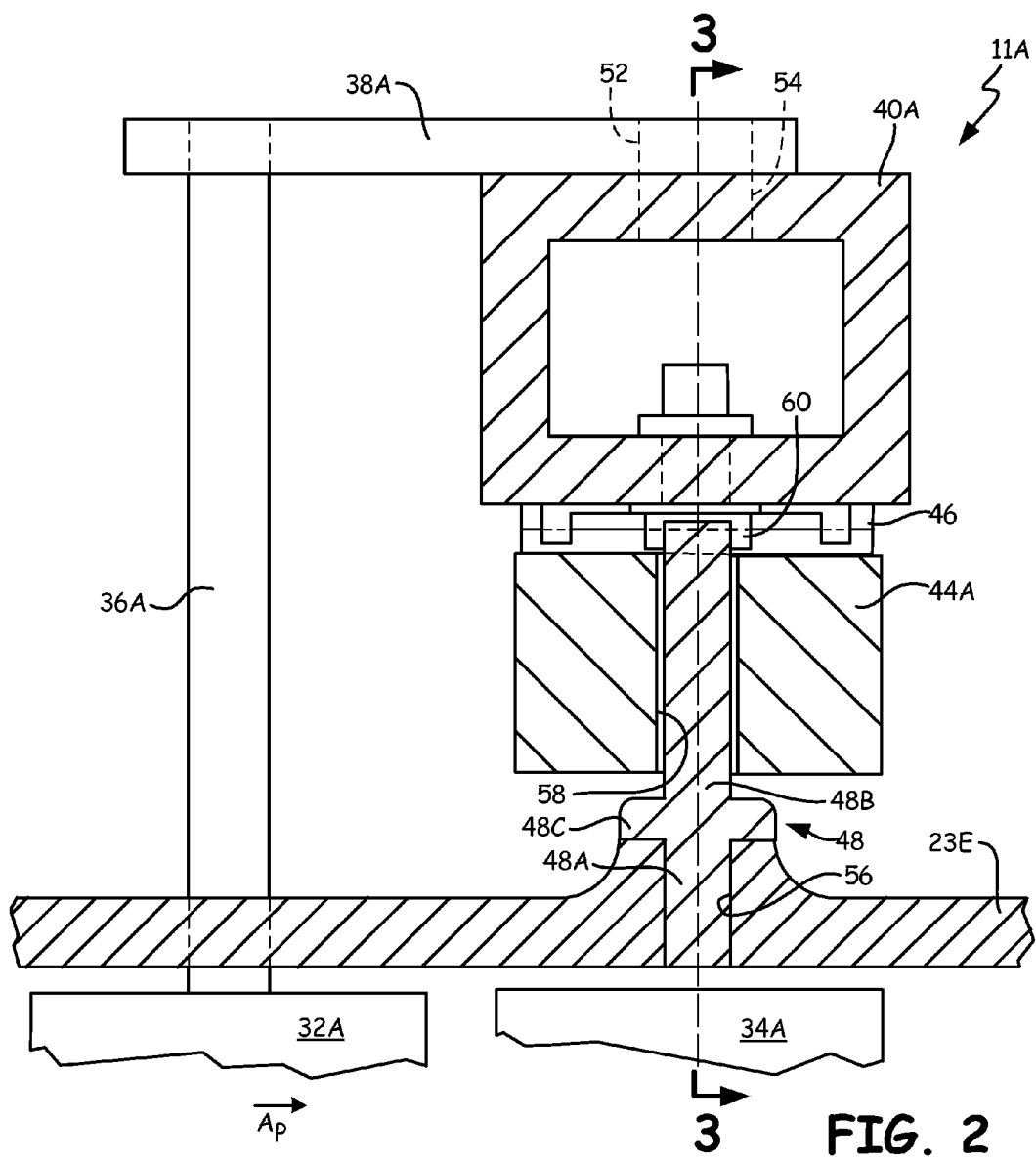
FIG. 2 shows an axial cross sectional view of the variable vane actuation mechanism at callout Z in FIG. 1 and along line 2-2 in FIG. 3 including a synchronization ring.
Figure 3:
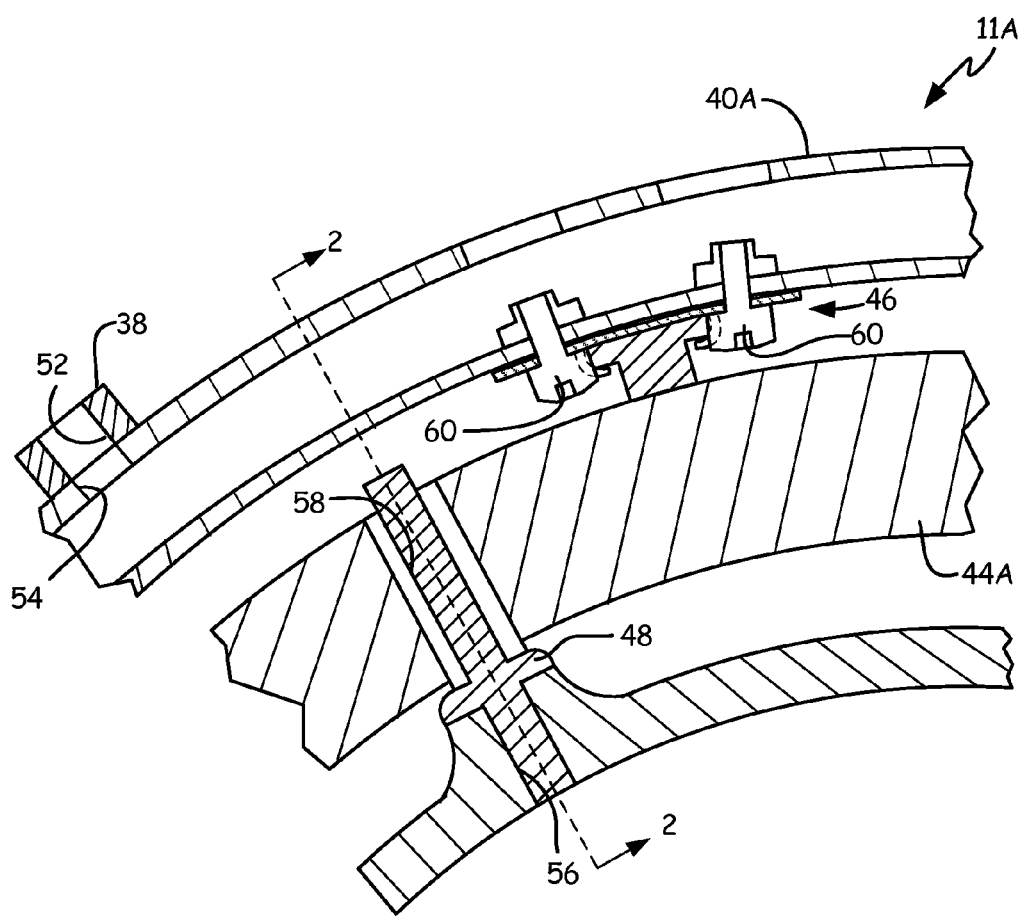
FIG. 3 shows a radial cross sectional view of the variable vane actuation mechanism at callout Z in FIG. 1 and along line 3-3 in FIG. 2.

FIG. 2 shows an axial cross sectional view of variable vane actuation mechanism 11A of the present invention, as shown at callout Z in FIG. 1 and along line 2-2 in FIG. 3. FIG. 3, which is discussed concurrently with FIG. 2, shows a radial cross sectional view taken along section line 3-3 of FIG. 2. Variable stator vanes 32A and rotor blades 34A are disposed radially within LPT case 23E within engine 10. Rotor blades 34A typically include various sealing systems such as knife edge seals, but such systems have been omitted from FIG. 2 for simplicity. Variable vane actuation mechanism 11A includes a plurality of crank arms 38A, synchronization ring 40A, runner ring 44A, a plurality of runner assemblies 46, and a plurality of radial pins 48, which are all disposed concentrically about LPT case 23E.

In the embodiment of the present invention shown in FIGS. 2 and 3, the outer diameter ends of variable vanes 32A include outer trunnions 36A that extend through engine case 23E such that vanes 32A are rotatable along their radial axes within engine 10 (shown in FIG. 1) to control the incidence of primary air $A_P$ onto blades 34A. The outer diameter ends of outer trunnions 36A are typically connected to upstream ends of crank arms 38A. Downstream ends of crank arms 38A connect with synchronization ring 40A. Crank arms 38A comprise generally rectangular levers that rigidly connect with outer trunnions 36A and rotatably connect with synchronization ring 40A using any method as is known in the art. For example, crank arms 38A include bore 52 and synchronization ring 40A includes bores 54, which align to accept threaded fasteners or pin connectors to maintain a connection that permits crank arm 38A to pivot on synchronization ring 40A. Synchronization ring 40A is connected to actuator 42A (shown in FIG. 1) through master arm 39A such that rotation of synchronization ring 40A about centerline CL of engine 10 can be effected. Synchronization ring 40A then acts upon crank arms 38A to cause radial rotation of outer trunnions 36A and vanes 32A. The amount of rotation can be small, such as five degrees, or large, as in eighty degrees, depending on the system requirements. As such, the pitch of vanes 32A can be adjusted to permit continually varied flow of primary air $A_P$ through vanes as is needed during transient loading operations of engine 10.

Runner ring 44A is disposed concentrically between synchronization ring 40A and LPT case 23E. Runner ring 44A is configured to float on radial pins 48 about LPT case 23E, such that LPT case 23E is free to expand in the radial direction from the heat of primary air $A_P$ without influencing runner ring 44A. Radial pins 48 include radially inner base portions 48A that extend into bores 56 of LPT case 23E to prevent movement of pins 48 with respect to LPT case 23E. For example, base portions 48A are force fit or threaded into bores 56. Radial pins 48 also include radially outer spline portions 48B that extend into bores 58 of runner ring 44A. Bores 58 are sized to permit runner ring 44A to freely float, or slide, upon spline portions 48B during all operating conditions of engine 10 (shown in FIG. 1). For example, bores 58 are sized to permit expansion and contraction of runner ring 44A without binding of bores 58 on pins 48. Pins 48 also include flange portions 48C that separate base portions 48A from spline portions 48B. Flange portions 48C provide a platform upon which runner ring 44A can rest, and provide a stop to control the distance base portions 48A can be inserted into bores 56. Radial pins 48 extend radially outward from LPT case 23E at regular intervals. Constructed as such, pins 48 and bores 58 assemble to form a radial spline that permits runner ring 44A to have only one degree of freedom to movement. Specifically, spline portions 48B permit runner ring 44A to translate radially from centerline CL, i.e. up or down along spline portions 48B. Backward or forward translation along centerline CL is prevented. Additionally, rotation of runner ring 44A about LPT case 23E and engine centerline CL is prevented.

In the embodiment shown, crank arms 38A are connected with synchronization ring 40A at the outer diameter surface of synchronization ring 40A. As such, synchronization ring 40A is suspended from crank arms 38A such that synchronization ring 40A is concentrically disposed about runner ring 44A. In other embodiments, however, crank arms 38A are connected to the inner diameter surface of synchronization ring 40A. In either case, synchronization ring 40A is cantilevered over LPT case 23E. Specifically, synchronization ring 40A is cantilevered over pins 48 such that runner ring 44A can be positioned between synchronization ring 40A and LPT case 23E. Synchronization ring 40A includes an inner diameter somewhat larger than the diameter comprising the outer ends of pins 48. Thus, LPT case 23E is permitted to thermally expand in the radial direction during operation of engine 10 without causing binding of pins 48 with synchronization ring 40A. Synchronization ring 40A is therefore not directly supported by or tied to LPT case 23E. To prevent deformation of synchronization ring 40A, runner ring 44A and runner assemblies 46 are provided between synchronization ring 40A and LPT case 23E.

Runner ring 44A comprises an independent rigid structure against which synchronization ring 40A is supported to maintain the circularity of synchronization ring 40A. As described above, runner ring 44A floats upon pins 48 above LPT case 23E. Because of the inherent rigidity and circularity of runner ring 44A, runner ring 44A is maintained some distance above LPT case 23E on pins 48. Additionally, space is provided between the outer circumferential surface of runner ring 44A and synchronization ring 40A to allow for the extension of pins 48 from LPT case 23E through runner ring 44A. Runner assemblies 46 are intermittently disposed about the inner circumferential surface of synchronization ring 40A between pins 48 to take up most or all of the remaining space between runner ring 44 and synchronization ring 40A. In the illustrated embodiment, runner assemblies 46 are secured to synchronization ring 40A with pin rivets 60. As such, synchronization ring 40A is rigidly supported at regular intervals along its inner diameter by runner assemblies 46.

The components and configuration of actuation mechanism 11A, specifically runner assemblies 46, substantially prevent synchronization ring 40A from losing centricity and/or circularity while still allowing synchronization ring 40A to slide over runner ring 44A without binding. This is important because small variations in the pitch actuation system of variable stator vanes 32A due to loss of centricity of synchronization ring 40A creates error and is undesirable.

Figure 4A:
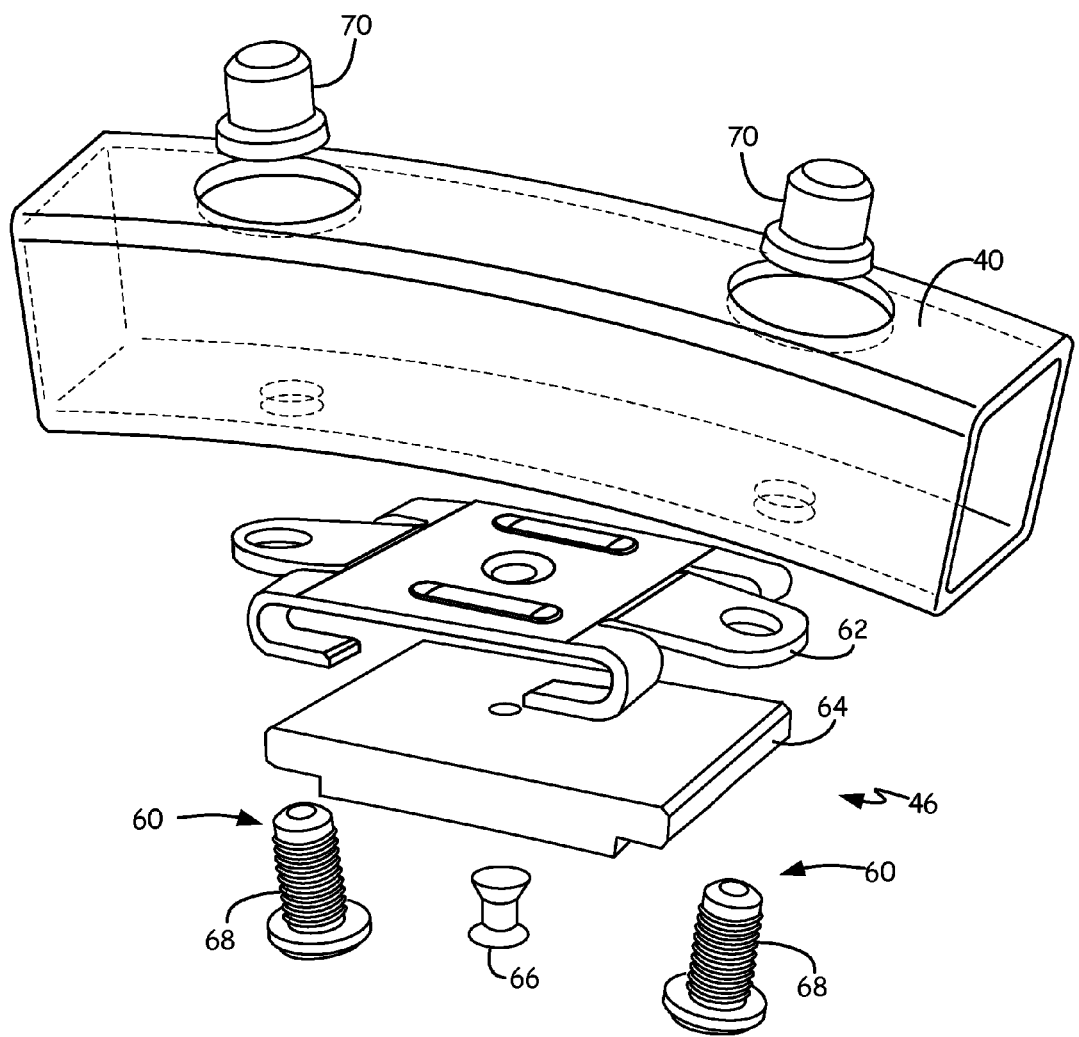
FIG. 4A shows an exploded perspective view of a runner assembly that is normally attached to the synchronization ring.
Figure 4B:
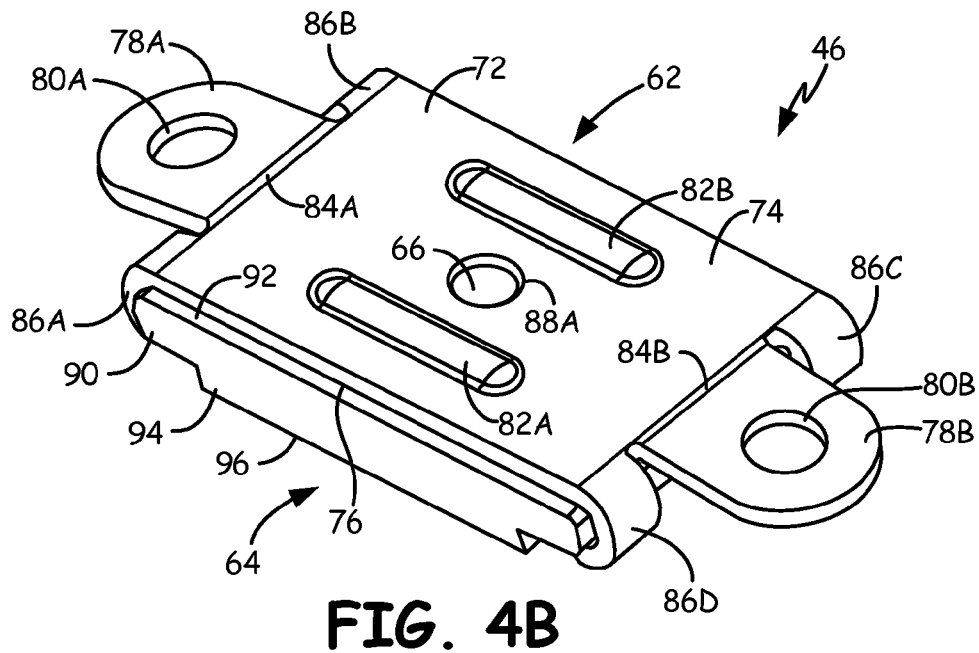
FIG. 4B shows a perspective view of a ring side of the runner assembly.
Figure 4C:
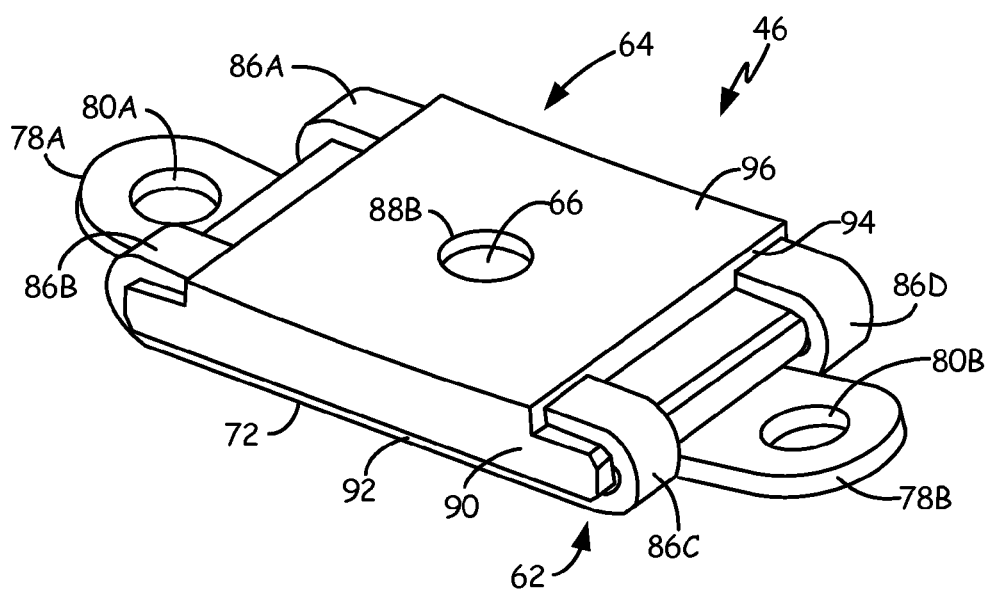
FIG. 4C shows a perspective view of a contact side of the runner assembly.
Figure 4D:
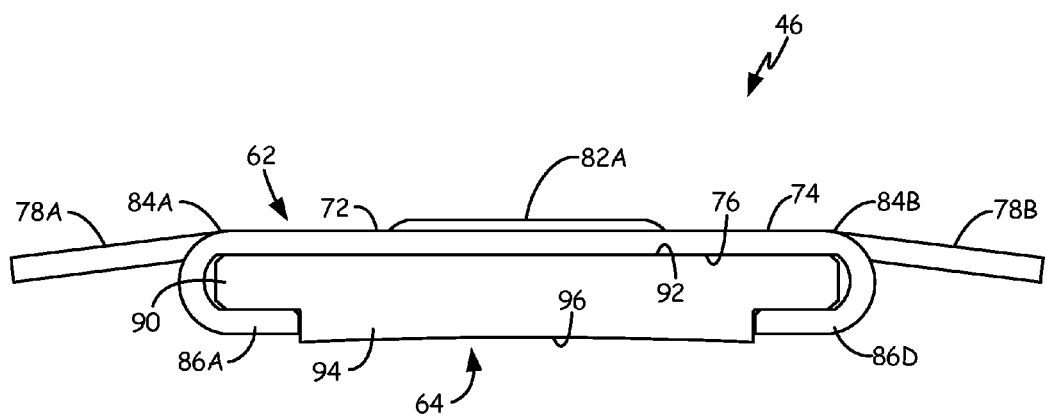
FIG. 4D shows an axial front view of the runner assembly.

In FIG. 4A, an exploded perspective view of runner assembly 46 that is normally attached to synchronization ring 40A is shown. In FIG. 4B, a perspective view of ring side 74 of runner assembly 46 is shown. In FIG. 4C, a perspective view of contact side 96 of runner assembly 46 is shown. In FIG. 4D, an axial front view of runner assembly 46 is shown. FIGS. 4A-4D will now be discussed simultaneously.

As shown in FIG. 4A, runner assembly 46 comprises cradle 62 which, in one embodiment, is attached to runner 64 by a fastener such as rivet 66. As stated previously, runner assembly 46 is attached to synchronization ring 40A by fasteners such as pin rivets 60. More specifically, each pin rivet 60 includes bolt 68 that passes through cradle 62 and into synchronization ring 40A where bolt 68 is captured by rivet nut 70. Bolts 68 have their drive feature opposite of the head end. In this configuration, runner assembly 46 can be attached by using two drivers (one for bolt 68 and another for rivet nut 70) that are both on the radially outward side of synchronization ring 40A.

As shown in FIG. 4B, cradle 62 includes base 72, which generally has a substantially flat, planar shape, with the exceptions of stiffening beads 82A-82B. Base 72 has ring side 74 adjacent to synchronization ring 40A (shown in FIG. 4A) and runner side 76 on the opposite side of base 72. Stiffening beads 82A-82B protrude into runner side 76 and extend outward from ring side 74. Cradle 62 also has tabs 78A-78B that extend from opposite ends of base 72, respectively. In the illustrated embodiment, tabs 78A-78B have a substantially flat, planar shape, although tabs 78A-78B could be curved. Tabs 78A-78B are not coplanar with base 72 and instead extend at an angle towards runner side 76. Because tabs 78A-78B extend at an angle, there are bends 84A-84B at the junctions of tabs 78A-78B and base 72, respectively. Each tab 78A-78B includes a fastener aperture, such as tab apertures 80A-80B, respectively, through which a bolt 68 (shown in FIG. 4A) passes in order to mount runner assembly 46 to an article, such as synchronization ring 40A.

Cradle 62 also includes fingers 86A-86D. Fingers 86A-86B originate from base 72 next to tab 80A, and fingers 86C-86D originate from base 72 next to tab 80B. Fingers 86A-86D extend outward from base 72 and are curved inward to oppose runner side 76. In the illustrated embodiment, cradle 62 is a stamped part that is comprised of sheet metal, such as steel.

Runner 64 comprises mounting portion 90 having cradle side 92 that is adjacent to and in contact with base 72 of cradle 62. Connected to mounting portion 90 is contact portion 94. Contact portion 94 of runner 64 includes contact side 96 which is on the opposite side of runner 64 from cradle side 92. While cradle side 92 is substantially planar to match the substantially planar shape of base 72, contact side 96 is curved in such a manner that corresponds to the curvature of runner ring 44A (shown in FIG. 2).

Runner 64 also includes a fastener aperture such as rivet aperture 88B that extends through mounting portion 90 and contact portion 94 of runner 64 from contact side 96 to cradle side 92. Rivet aperture 88B is aligned with a fastener aperture in cradle 62, such as rivet aperture 88A, which extends through cradle 62 from runner side 76 to ring side 74. Rivet 66 extends through rivet apertures 88A-88B to attach runner 64 to cradle 62. In the illustrated embodiment, rivet aperture 88A is countersunk such that rivet 66 does not extend beyond ring side 74 of cradle 62.

If runner 64 is positioned in a fan or compressor section of gas turbine engine 10 (shown in FIG. 1), runner 64 can be comprised of a composite material. Such composite materials include, but are not limited to, Vespel® CP-0301 and CP-0650 available from DuPont™ of Newark, Del. These materials are particularly well-suited for runner 64 because they can include fibers that can be oriented with geometrically oriented properties. More specifically, the fibers in the polymer-composite material can be oriented in specific directions during the forming of runner 64. The result of such construction is that mounting portion 90 can be optimized for strength while contact portion 94 can be optimized for wear resistance. If runner 64 is positioned in a turbine section of gas turbine engine 10 (shown in FIG. 1), runner 64 can be comprised of a high-temperature resistant composite material In order to assemble runner assembly 46, mounting portion 90 of runner 64 is slid into cradle 62, between runner side 76 of base 72 and fingers 86A-86D. Then rivet 66 is inserted through rivet aperture 88A in cradle 62 and rivet aperture 88B in runner 64. Rivet 66 is then deformed in order to attach runner 64 to cradle 62, preventing runner 64 from sliding out of cradle 62. In the illustrated embodiment, fingers 86A-86D are adjacent to runner 64 and extend around mounting portion 90, constraining movement (including rotational movement) of runner 64 with respect to cradle 62 and rivet 66. Fingers 86A-86D can also exert force onto mounting portion 90 to hold runner 62, although this is not necessary due to rivet 66. In addition, contact portion 94 is shorter than mounting portion 90 and also shorter than the distance between fingers 86A and 86D. This creates two shoulders over which fingers 86A-86D extend, although contact portion 94 extends from mounting portion 90 of runner 64 beyond fingers 86A-86D in order to contact runner ring 44A (shown in FIG. 3).

When runner assembly 46 is installed on synchronization ring 40A (shown in FIG. 3), runner ring 44A (also shown in FIG. 3) can exert force on contact side 96. This can flex runner assembly 46 toward synchronization ring 40A. Stiffening beads 82A-82B resist this flexing, but if the force is sufficient, stiffening beads 82A-82B will serve as a bump-stop against synchronization ring 40A. This limits the amount of bending that runner 64 endures under loading.

The components and configuration of runner assembly 46 allow for runner 64 to be mounted to synchronization ring 40A in order to contact runner ring 44A. In addition, runner 64 can have a simple shape because only one curved side (contact side 96) is necessary while the other sides (including cradle side 92) can be substantially planar. In addition, because of bends 84A-84B, base 72 and tabs 78A-78B can be substantially planar while still allowing runner assembly 46 to be mounted to synchronization ring 40A, which is curved.

Depicted in FIGS. 4A-4D is one embodiment of the present invention, to which there are alternatives. For example, rivet 66 can be a different type of fastener or combination of fasteners (such as a nut and bolt). For another example, pin rivets 60 can be a different type of fastener or combination of fasteners (such as a traditional rivet or nut/bolt combination). For yet another example, cradle 62 can have another number of fingers 86A-86D besides four.

Figure 5:
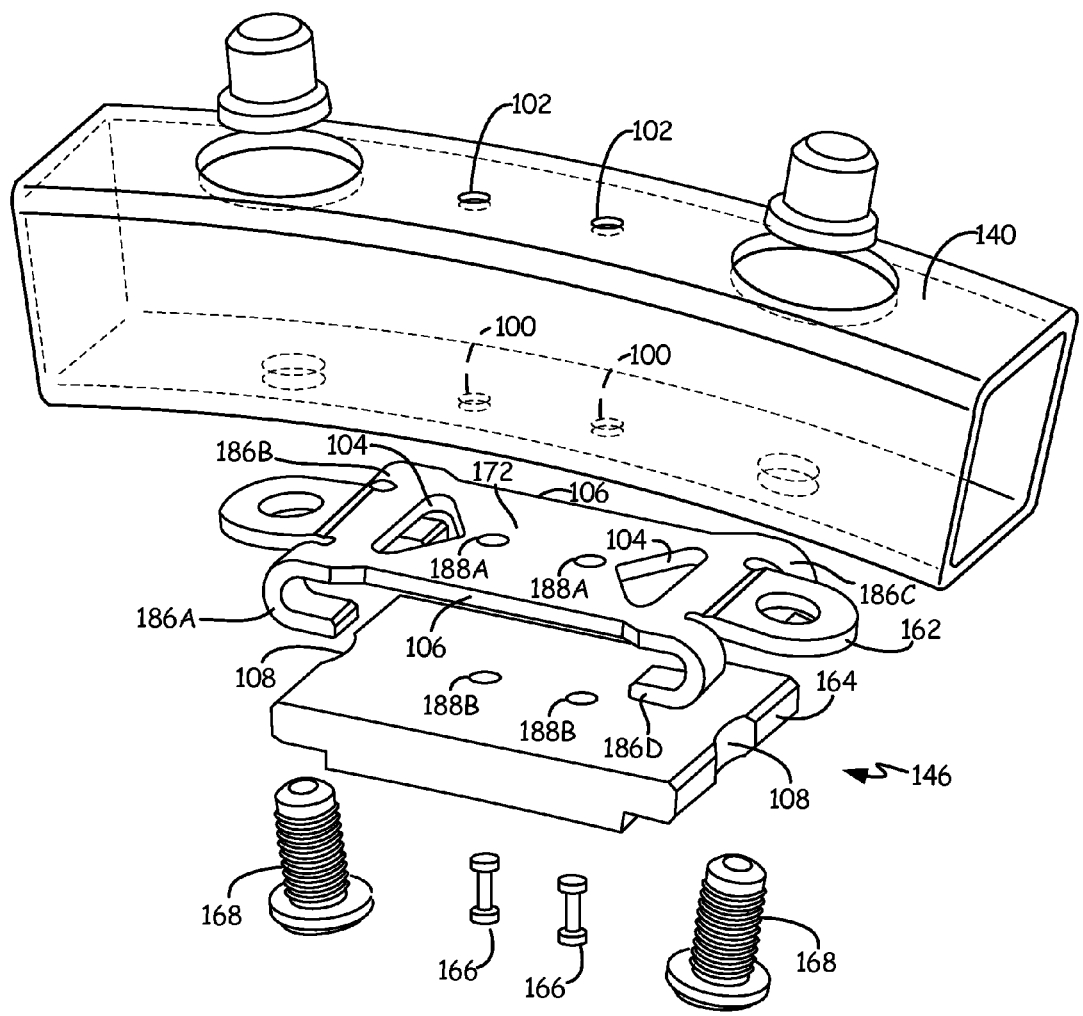
FIG. 5 shows an exploded perspective view of an alternate embodiment runner assembly.

In FIG. 5, an exploded perspective view of an alternate embodiment runner assembly 146 is shown. In the illustrated alternate embodiment, similar parts to the previous embodiment have reference numerals that are one hundred greater. For example, runner assembly 146 is similar in function to runner assembly 46. Runner assembly 146 includes two rivets 166, so cradle 162 includes two rivet apertures 188A and runner 164 includes two rivet apertures 188B. Furthermore, rivets 166 are not countersunk on their outermost ends, so synchronization ring 140 includes relief apertures 100 into which rivets 166 extend when runner assembly 146 is attached to synchronization ring 140. In order to form relief apertures 100, synchronization ring 140 is cut from the outermost side, which leaves an outer aperture 102 for each relief aperture 100.

Cradle 146 includes a plurality of base lightening cuts 104 and edge cuts 106 in base 172 to reduce the weight of runner assembly 146. Runner 164 includes two side cuts 108 in order to accommodate the heads of bolts 168.

The components and configuration of runner assembly 146 allow for cradle 146 to be lightened. In addition, fingers 186A-186D can have a looser fit to runner 164 because rotation is prevented by having two rivets 166.

Figure 6:
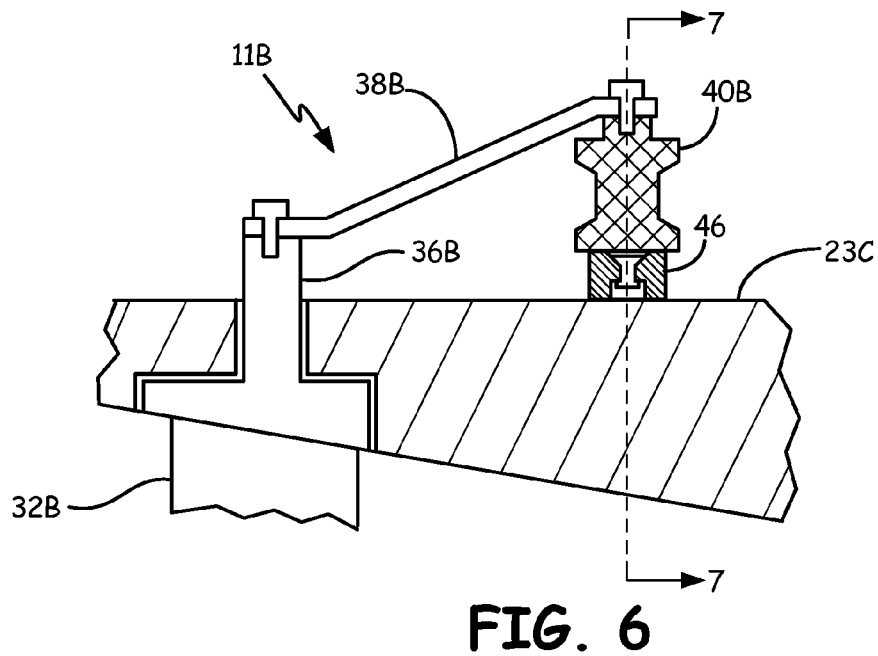
FIG. 6 shows an axial cross sectional view of the variable vane actuation mechanism at callout Y in FIG. 1 and along line 6-6 in FIG. 3 including a synchronization ring.
Figure 7:
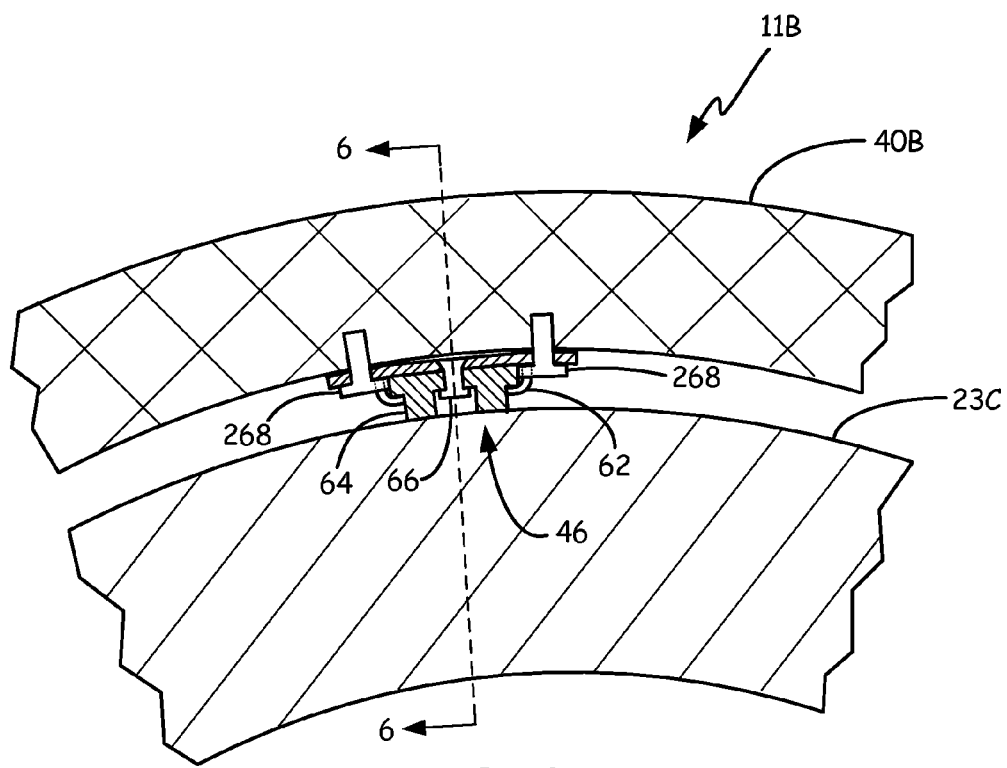
FIG. 7 shows a radial cross sectional view of the variable vane actuation mechanism at callout Y in FIG. 1 and along line 7-7 in FIG. 6.

In FIG. 6, an axial cross sectional view of variable vane actuation mechanism 11B is shown at callout Y in FIG. 1 and along line 6-6 in FIG. 3. In FIG. 7, a radial cross sectional view of variable vane actuation mechanism 11B is shown at callout Y in FIG. 1 and along line 7-7 in FIG. 6. FIGS. 6-7 will now be discussed simultaneously In FIG. 6 variable vane actuation mechanism 11B includes a plurality of crank arms 38B, synchronization ring 40B, and a plurality of runner assemblies 46, which are all disposed concentrically about HPC case 23C (although only one crank arm 38B and one runner assembly 46 is shown for simplicity). Each variable stator vane 32B includes outer trunnion 36B, which extends through HPC case 23C and connects with crank arm 38B. Crank arm 38B is in turn connected to synchronization ring 40B. When synchronization ring 40B is rotated circumferentially around HPC case 23C, crank arms 38B are also rotated, causing trunnions 36B and vanes 32B to rotate about their radial axes.

In the embodiment shown, synchronization ring 40B is suspended from crank arms 38B such that synchronization ring 40B is concentrically disposed about HPC case 23C. Specifically, synchronization ring 40B is cantilevered around HPC case 23C and is therefore not directly in contact with or attached to HPC case 23C. To prevent deformation of synchronization ring 40B, a plurality of runner assemblies 46 are provided between synchronization ring 40B and HPC case 23C. Runner assemblies 46 are intermittently disposed about the inner circumferential surface of synchronization ring 40B to take up most or all of the remaining space between HPC case 23C and synchronization ring 40B.

A shown in the illustrated embodiment of FIG. 7, runner assemblies 46 are secured to synchronization ring 40B bolts 268. As discussed previously, each runner assembly 46 include runner 64 which is supported by cradle 62 (and attached thereto by rivet 66). As an alternative, runner assembly 46 could be any embodiment of the present invention including runner assembly 146 of FIG. 5.

It should be recognized that the various embodiments of the present invention provides numerous benefits and advantages. For example, the runner assembly has a low profile, which reduces the diameter of the synchronization ring. For another example, the pin rivets only contact the cradle, so the force of fastening the runner assembly to the synchronization ring is not transmitted through the runner.

Discussion of Embodiments

The features and elements maybe combined in various combinations without exclusivity, unless expressly indicated otherwise. These features and elements, as well as the operation thereof, will become more apparent in light of the description and the accompanying drawings. It should be understood, however, the description and drawings are intended to be exemplary in nature and non-limiting.

A runner assembly according to an exemplary embodiment of this disclosure, among other possible things, includes: a runner including a first fastener aperture; a cradle comprising: a substantially planar base including a second fastener aperture; a first tab extending from the base configured for mounting the runner assembly to an article; and a plurality of fingers extending from the base; and a first fastener extending through the first and second fastener apertures for attaching the runner to the cradle; wherein the plurality of fingers are adjacent to the runner and constrain the runner with respect to the cradle and the first fastener.

A further embodiment of the foregoing runner assembly wherein the first tab can include a tab aperture, and can further comprise: a second fastener extending through the tab aperture for attaching the runner assembly to the article.

A further embodiment of any of the foregoing runner assemblies wherein runner assembly can further comprise: a second tab extending from the base opposite of the first tab, the second tab configured for attaching the runner assembly to the article.

A further embodiment of any of the foregoing runner assemblies wherein the first and second tabs are can each be substantially planar.

A further embodiment of any of the foregoing runner assemblies wherein the runner can include a cradle side that is adjacent to the base of the cradle, the cradle side being substantially planar.

A further embodiment of any of the foregoing runner assemblies wherein the runner can include a mounting portion and the plurality of fingers can extend around the mounting portion.

A further embodiment of any of the foregoing runner assemblies wherein the runner assembly can further comprise: a stiffening bead in the base.

A further embodiment of any of the foregoing runner assemblies wherein the runner assembly can further comprise: a lightening cut in the base.

A runner assembly according to an exemplary embodiment of this disclosure, among other possible things, includes a cradle comprising: a substantially planar base having a ring side, a runner side, a first end, and a second end, the base including a first fastener aperture extending through the base; a first tab extending from the first end, the first tab including a first tab aperture; a second tab extending from the second end, the second tab including a second tab aperture; a first finger that extends from the first end and is curved; and a second finger that extends from the second end and is curved; a runner comprising: a mounting portion positioned between the first and second fingers and the base of the cradle, including a substantially planar cradle side that contacts the runner side of the base; a contact portion with a curved contact side that is opposite of the cradle side; and a second fastener aperture extending through the mounting portion and the contact portion; and a first fastener extending through the first and second fastener apertures, the fastener attaching the runner to the cradle.

A further embodiment of the foregoing runner assembly wherein the base of the cradle can include a stiffening bead.

A further embodiment of any of the foregoing runner assemblies wherein the runner assembly can further comprise: a first bend at a junction of the first tab and the base; and a second bend at a junction of the second tab and the base; wherein the first and second tabs extend toward the runner side of the base.

A further embodiment of any of the foregoing runner assemblies wherein the first and second fingers can be curved.

A further embodiment of any of the foregoing runner assemblies wherein the base of the cradle can include a lightening cut.

A further embodiment of any of the foregoing runner assemblies wherein the cradle can be comprised of sheet metal.

A further embodiment of any of the foregoing runner assemblies wherein the runner can be comprised of a composite material.

A further embodiment of any of the foregoing runner assemblies wherein the runner comprises composite material including fibers.

A further embodiment of any of the foregoing runner assemblies wherein the contact portion of the runner can extend beyond the first and second fingers.

A further embodiment of any of the foregoing runner assemblies wherein the cradle can include a third fastener aperture and the runner can include a fourth fastener aperture, and can further comprise: a second fastener that can extend through the third and fourth fastener apertures.

A further embodiment of any of the foregoing runner assemblies wherein the cradle can further comprise: a third finger that can extend from the first end and can be curved; and a fourth finger that can extend from the second end and can be curved.

A further embodiment of any of the foregoing runner assemblies wherein the contact portion of the runner can be shorter than mounting portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A runner assembly comprising:
    a runner including a first fastener aperture;
    a cradle comprising:
        a substantially planar base including a second fastener aperture, the base comprising a stiffening bead;
        a first tab extending from the base configured for mounting the runner assembly to an article; and
        a plurality of fingers extending from the base; and
    a first fastener extending through the first and second fastener apertures for attaching the runner to the cradle;
    wherein the plurality of fingers are adjacent to the runner and constrain the runner with respect to the cradle and the first fastener.

2. The runner assembly of claim 1, wherein the first tab includes a tab aperture, and further comprises:
    a second fastener extending through the tab aperture for attaching the runner assembly to the article.

3. The runner assembly of claim 1, and further comprising:
    a second tab extending from the base opposite of the first tab, the second tab configured for attaching the runner assembly to the article.

4. The runner assembly of claim 3, wherein the first and second tabs are each substantially planar.

5. The runner assembly of claim 1, wherein the runner includes a cradle side that is adjacent to the base of the cradle, the cradle side being substantially planar.

6. The runner assembly of claim 1, wherein the runner includes a mounting portion and the plurality of fingers extend around the mounting position.

7. The runner assembly of claim 1, and further comprising:
    a lightening cut in the base.

8. A runner assembly comprising:
    a cradle comprising:
        a substantially planar base having a ring side, a runner side, a first end, and a second end, the base including a first fastener aperture extending through the base;
        a first tab extending from the first end, the first tab including a first tab aperture;
        a second tab extending from the second end, the second tab including a second tab aperture;
        a first finger that extends from the first end;
        a second finger that extends from the second end;
        a first bend at a junction of the first tab and the base; and
        a second bend at a junction of the second tab and the base;
        wherein the first and second tabs extend toward the runner side of the base; and
    a runner comprising:
        a mounting portion positioned between the first and second fingers and the base of the cradle, including a substantially planar cradle side that contacts the runner side of the base;
        a contact portion with a curved contact side that is opposite of the cradle side; and
        a second fastener aperture extending through the mounting portion and the contact portion; and
        a first fastener extending through the first and second fastener apertures, the fastener attaching the runner to the cradle.

9. The runner assembly of claim 8, wherein the base of the cradle includes a stiffening bead.

10. The runner assembly of claim 8, wherein the first and second fingers are curved.

11. The runner assembly of claim 8, wherein the base of the cradle includes a lightening cut.

12. The runner assembly of claim 8, wherein the cradle is comprised of sheet metal.

13. The runner assembly of claim 8, wherein the runner is comprised of a composite material.

14. The runner assembly of claim 13, wherein the runner comprises a composite material including fibers.

15. The runner assembly of claim 8, wherein the contact portion of the runner extends beyond the first and second fingers.

16. The runner assembly of claim 8, wherein the cradle includes a third fastener aperture and the runner includes a fourth fastener aperture, and further comprising:
    a second fastener that extends through the third and fourth fastener apertures.

17. The runner assembly of claim 8, wherein the cradle further comprises:
    a third finger that extends from the first end and is curved; and
    a fourth finger that extends from the second end and is curved.

18. The runner assembly of claim 8, wherein a length of the contact portion of the runner between the first and second fingers is shorter than a length of the mounting portion between the first and second fingers.

19. A runner assembly comprising:
    a cradle comprising:
        a substantially planar base having a ring side, a runner side, a first end, and a second end, the base including a first fastener aperture extending through the base;
        a first tab extending from the first end, the first tab including a first tab aperture;
        a second tab extending from the second end, the second tab including a second tab aperture;
        a first finger that extends from the first end; and
        a second finger that extends from the second end; and
    a runner comprising:
        a mounting portion positioned between the first and second fingers and the base of the cradle, including a substantially planar cradle side that contacts the runner side of the base;
        a contact portion with a curved contact side that is opposite of the cradle side; and
        a second fastener aperture extending through the mounting portion and the contact portion; and
        a first fastener extending through the first and second fastener apertures, the fastener attaching the runner to the cradle;

wherein the contact portion of the runner extends beyond the first and second fingers.

20. The runner assembly of claim 19, and further comprising:
a first bend at a junction of the first tab and the base; and
a second bend at a junction of the second tab and the base;
wherein the first and second tabs extend toward the runner side of the base.

\* \* \* \* \*